(12) United States Patent
Wei

(10) Patent No.: US 11,300,697 B2
(45) Date of Patent: Apr. 12, 2022

(54) MODIFIED BASEPLATE FOR SANDY SOIL

(71) Applicant: INOVA LTD., Sugar Land, TX (US)

(72) Inventor: Zhouhong Wei, Sugar Land, TX (US)

(73) Assignee: INOVA LTD., Grand Cayman (KY)

( * ) Notice: Subject to any disclaimer, the term of this patent is extended or adjusted under 35 U.S.C. 154(b) by 250 days.

(21) Appl. No.: 16/314,322

(22) PCT Filed: Sep. 27, 2017

(86) PCT No.: PCT/US2017/053693
§ 371 (c)(1),
(2) Date: Dec. 28, 2018

(87) PCT Pub. No.: WO2018/064153
PCT Pub. Date: Apr. 5, 2018

(65) Prior Publication Data
US 2021/0141109 A1    May 13, 2021

Related U.S. Application Data

(60) Provisional application No. 62/400,185, filed on Sep. 27, 2016, provisional application No. 62/473,753, filed on Mar. 20, 2017.

(51) Int. Cl.
*G01V 1/047* (2006.01)
*G01V 1/147* (2006.01)

(52) U.S. Cl.
CPC .............. *G01V 1/047* (2013.01); *G01V 1/147* (2013.01); *G01V 2210/1295* (2013.01)

(58) Field of Classification Search
CPC . G01V 1/047; G01V 1/147; G01V 2210/1295

USPC .......................................................... 181/101
See application file for complete search history.

(56) References Cited

U.S. PATENT DOCUMENTS

| | | | | |
|---|---|---|---|---|
| 4,135,599 A * | 1/1979 | Fair | ........................ | G01V 1/053 |
| | | | | 181/121 |
| 4,143,736 A * | 3/1979 | Fair | ........................ | G01V 1/155 |
| | | | | 181/119 |
| 4,270,626 A | 6/1981 | Pritchett | | |
| 4,402,381 A * | 9/1983 | Airhart | .................. | G01V 1/147 |
| | | | | 124/56 |
| 4,697,667 A * | 10/1987 | Kirby | ..................... | G01V 1/047 |
| | | | | 181/113 |

(Continued)

FOREIGN PATENT DOCUMENTS

| | | |
|---|---|---|
| CN | 87103769 A | 3/1988 |
| CN | 101389980 A | 3/2009 |
| EP | 2363734 A1 | 9/2011 |

*Primary Examiner* — Forrest M Phillips
(74) *Attorney, Agent, or Firm* — Mossman, Kumar & Tyler PC

(57) ABSTRACT

A seismic source includes a base plate having a bottom surface contacting a surface of the ground. The coupler is connectable to the bottom surface of the base plate and projects downward from the base plate. The coupler contain soil under the base plate during operation. Another seismic source includes a base plate and at least one contact member. The base plate has an upper surface engaging the seismic source, a lower surface configured to contact a soil surface. The contact member projects from the lower surface and has a planar bottom surface with a surface area less than a surface area of the base plate lower surface.

13 Claims, 3 Drawing Sheets

(56) References Cited

U.S. PATENT DOCUMENTS

| | | | | |
|---|---|---|---|---|
| 4,712,641 A | * | 12/1987 | Chelminski | G01V 1/047 181/113 |
| 4,739,859 A | * | 4/1988 | Delano | G01V 1/047 181/119 |
| 4,875,544 A | * | 10/1989 | Airhart | G01V 1/047 181/113 |
| 5,187,331 A | * | 2/1993 | Sakata | G01V 1/153 181/114 |
| 5,252,782 A | | 10/1993 | Cantrell et al. | |
| 6,119,804 A | * | 9/2000 | Owen | G01V 1/047 181/113 |
| 6,612,396 B1 | | 9/2003 | Chelminski et al. | |
| 2011/0198147 A1 | | 8/2011 | Eick et al. | |
| 2012/0269040 A1 | * | 10/2012 | Wei | G01V 1/145 367/189 |
| 2016/0334522 A1 | * | 11/2016 | Eick | G01V 1/145 |

\* cited by examiner

MODIFIED BASEPLATE FOR SANDY SOIL

BACKGROUND OF THE DISCLOSURE

1. Field of the Disclosure

The present disclosure generally relates to seismic prospecting and in particular to baseplates for sandy soils.

2. Description of the Related Art

In the oil and gas exploration industry, vibrator trucks with base plates are commonly employed in order to identify a subterranean structure having potential hydrocarbon deposits. Many different techniques are used to generate a seismic signal. The imparted energy, known as the seismic source signal or "pilot" signal, travels through the subsurface and reflects some of the energy from certain subsurface geological boundaries or layers. The reflected energy is then transmitted back to the earth's surface where it is recorded using an earth motion detector. The recorded data is processed to yield information about a location and physical properties of layers making up the subsurface.

The present disclosure provides improved base plates for seismic vibrator trucks.

SUMMARY OF THE DISCLOSURE

In aspects, the present disclosure provides an apparatus for seismic surveying. The apparatus may include a base plate driven by a seismic source. The base plate has a bottom surface contacting a surface of the ground. The coupler is connectable to the bottom surface of the base plate and projects downward from the base plate. The coupler is configured to contain soil under the base plate.

In aspects, the present disclosure provides a method for seismic surveying. The method includes connecting a coupler to a base plate, wherein the coupler has at least one downwardly projecting wall; positioning a seismic source over a ground surface having unconsolidated soil; contacting the ground with the base plate and coupler; and preventing soil under the base plate from shift from beneath the base plate using the at least one wall.

In further aspects, the present disclosure provides an apparatus generating seismic signals in an earth formation that includes a seismic source, a base plate, and at least one contact member. The base plate is driven by the seismic source. The base plate has an upper surface engaging the seismic source, a lower surface configured to contact a soil surface, and a perimeter. The at least one contact member projects from the lower surface and has a planar bottom surface with a surface area less than a surface area of the base plate lower surface.

In further aspects, the present disclosure provides a method for generating seismic signal that includes positioning a seismic source over a ground surface having unconsolidated soil; driving a base plate using the seismic source, the base plate having an upper surface engaging the seismic source, a lower surface configured to contact a soil surface, and a perimeter; and contacting a soil surface using only at least one contact member projecting from the lower surface, the at least one contact member having a bottom surface with a surface area less than a surface of the base plate lower surface.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DETAILED DESCRIPTION OF THE DISCLOSURE

Figure 1:
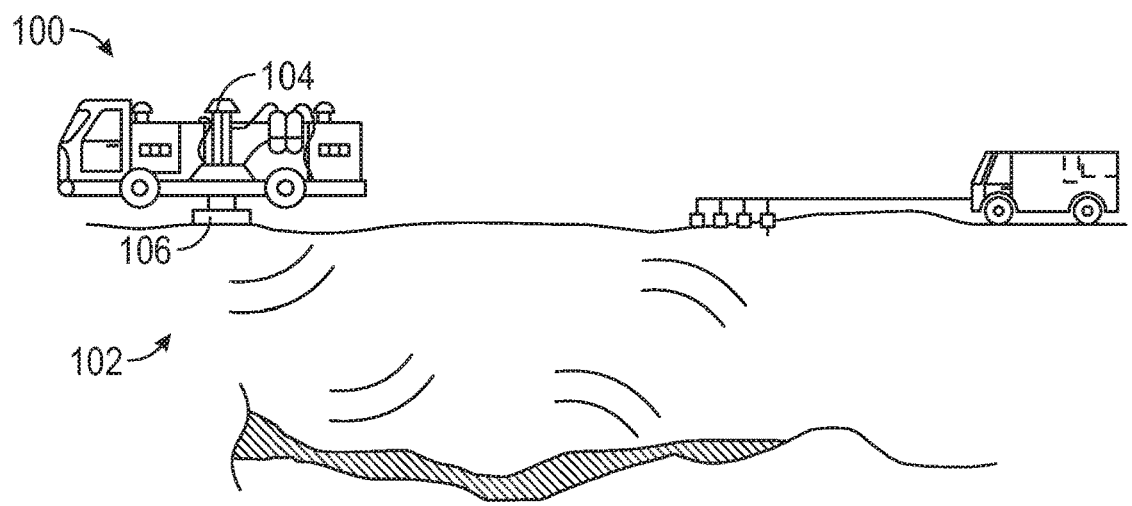
FIG. 1 illustrates a typical seismic data acquisition operation utilizing aspects of the present disclosure.

FIG. 1 depicts a geophysical survey layout that may use target seismic frequency sweeps developed in accordance with embodiments of the present disclosure. A truck-carried vibratory seismic source 100 is positioned at a predetermined location in an area of exploration and coupled to the earth. The seismic source 100 includes a truck 170 and a hydraulic subsystem used to move a reaction mass 104. The moving reaction mass 104 acts upon a base plate 106 to impart a seismic source signal 102 into the earth. The signal 102 travels through the earth, reflects at discontinuities and formations, and travels toward the earth's surface. The base plate 106 is substantially parallel with the surface 110. By "substantially," it is meant that a majority of a bottom surface of the base plate 106 contacts the ground underneath the base plate 106 during operation.

Figure 2:
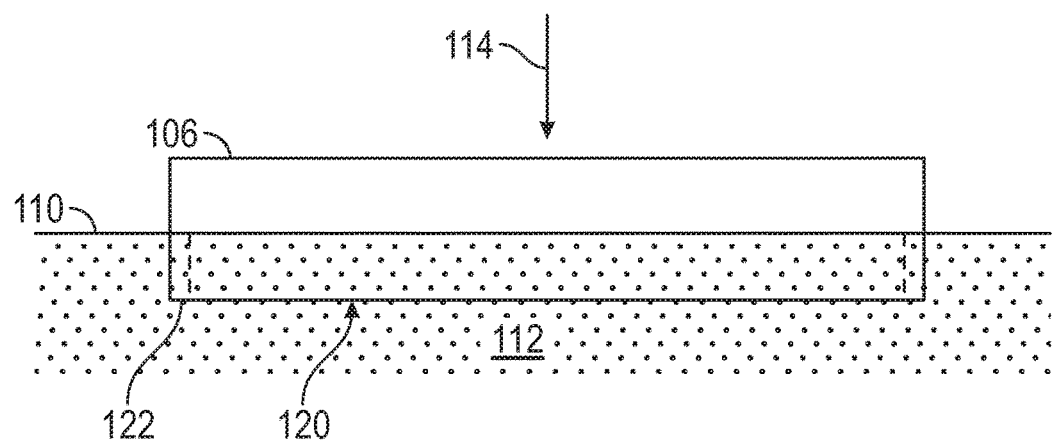
FIG. 2 is a schematic side view of one base plate and coupler according to the present disclosure.

FIG. 2 illustrates one non-limiting embodiment of a base plate 106 according to the present disclosure. The base plate 106 is a generally flat plate configured to contact a surface 110 of the earth 112. Some soil may be considered "consolidated" in that the material making up the soil behaves like a solid and retains shape when subjected to pressure. For consolidated soil, the base plate 106 may provide adequate coupling during operation.

Other soil may be considered "unconsolidated" in that the material making up the soil may be fluid-like. For instance, the soil making up the earth 112 beneath the base plate 106 may be granular and exhibit fluid-like flow when pressure is applied by the base plate 106 in a downward vertical direction shown by arrow 114. Sand is one typical type of soil that exhibits such characteristics. For unconsolidated soil, the base plate 106 may physically decouple from the soil, which then degrades performance. By decouple, it is meant a loss of physical contact that reduces the transmission of force from the base plate 106 to the soil, particularly in the normal direction.

For unconsolidated soil, the base plate 106 includes a coupler 120 that prevents soil from shifting or flowing out from underneath the base plate 106 when the base plate 106 applies a force to the earth 112 in the downward vertical direction. The coupler 120 may be a frame or other structural body that include walls 122 that project transversely downward from a bottom surface of the base plate 106. Thus, the bottom surface of the base plate 106 and walls 122 face, or are immediately adjacent to, the surface of the ground. The walls 122 penetrate into the earth 112 and form barriers that force the soil to remain under the base plate 106. In FIG. 2, the coupler 120 has a shape that conforms to the shape of the base plate 106, which may be square or rectangular. The walls 122 may be formed along the perimeter of the coupler 120.

Figure 3:
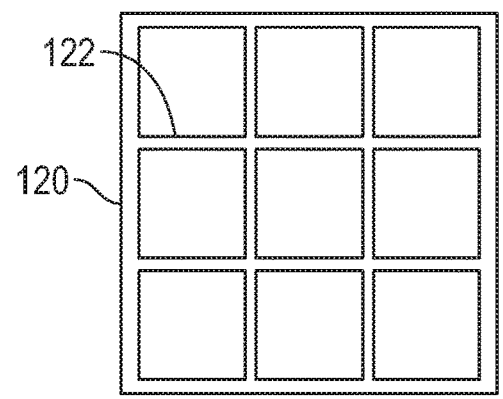
FIG. 3 illustrates a bottom view of another coupler according to the present disclosure.

FIG. 3 shows a bottom view of another embodiment of a coupler 120. In this embodiment, the walls 122 are arranged to intersect in a grid-like manner. This may be referred to a "waffle" type of structure. As in the FIG. 2 embodiment, the walls 122 prevent soil from shifting from directly underneath the base plate 106. The bottom surface of the base plate 106 confines the soil along a first vertical axis/direction and the walls 122 confines the solid along a second horizontal axis/direction, which is transverse to the vertical axis/direction.

Referring to FIGS. 1-3, during use, the base plate 106 may be operated to generate a wavelet. A wavelet in the frequency domain is characterized by a pulse having an amplitude sustained over a predefined time period. It is desirable to have the amplitude not vary during this time period.

For operations involving consolidated soil, the seismic source 100 has a first configuration wherein the base plate 106 alone contacts the ground. For operations involving unconsolidated soil, the seismic source 100 has a second configuration wherein the coupler 120 is attached to the base plate 106.

In the second configuration, when the base plate 106 initially begins applying force, it is believed that soil shifting out from underneath the base plate 106 may cause the base plate 106 to decouple from the earth and create undesirable variations in the amplitude. Advantageously, the coupler 120 forms a physical barrier that prevents soil such as sand from flowing or moving out from beneath the base plate 106 as pressure is applied.

As used in the present application "beneath" means directly beneath or under the base plate 106. For the purposes of the present application, soil that is below and adjacent to the base plate 106 is not "beneath" the base plate 106. The reason is that soil adjacent to the base plate 106 does not assist in coupling the base plate 106 to the earth 112. Only soil beneath the base plate 106 aids in such coupling. Because the coupler 120 prevents soil from shifting to a location adjacent to the base plate 106, the base plate 106 remains coupled to the earth 112 during the entire time during which the wavelet is generated.

Thus, the coupler 120 may be formed as a detachable structure that can be fitted onto the bottom of the base plate 106. For example, the coupler 120 may include clips, clamps, fasteners, or other coupling members that can attach a frame having one or more walls to the base plate 106. Thus, the coupler 120 may be removed from the base plate 106 when the soil is not sandy or very unconsolidated. Seismic sources and base plate can be moved between consolidated and unconsolidated soils and the coupler may be added or removed as needed. The coupler 120 is not limited to only grid-type of patterns. Also, the walls may be continuous or discontinuous. The coupler 120 may be formed of plastics, ceramics, or metals. In other embodiments, the base plate 106 may have an integral wall or walls that confine soil as described above.

Other base plates and base plate modifications for enhancing the effectiveness of seismic sources are shown in FIGS. 4 to 6A-D.

Figure 4:
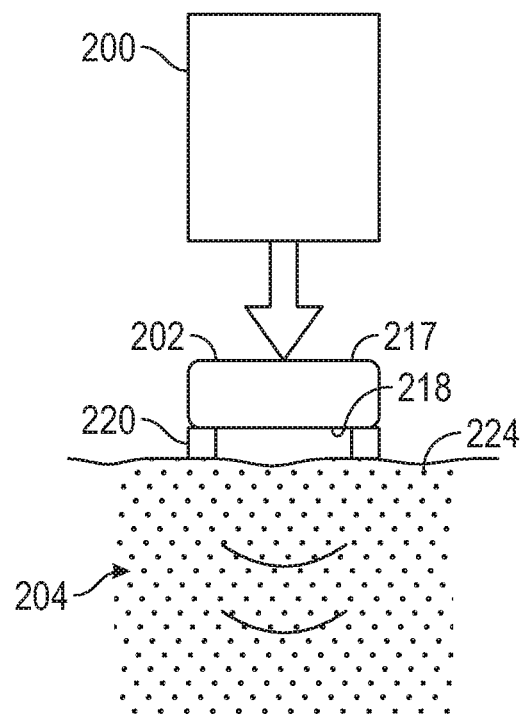
FIGS. 4 to 6A-D illustrate base plates and base plate modifications for enhancing the effectiveness of seismic sources by using contact members.
Figure 5:
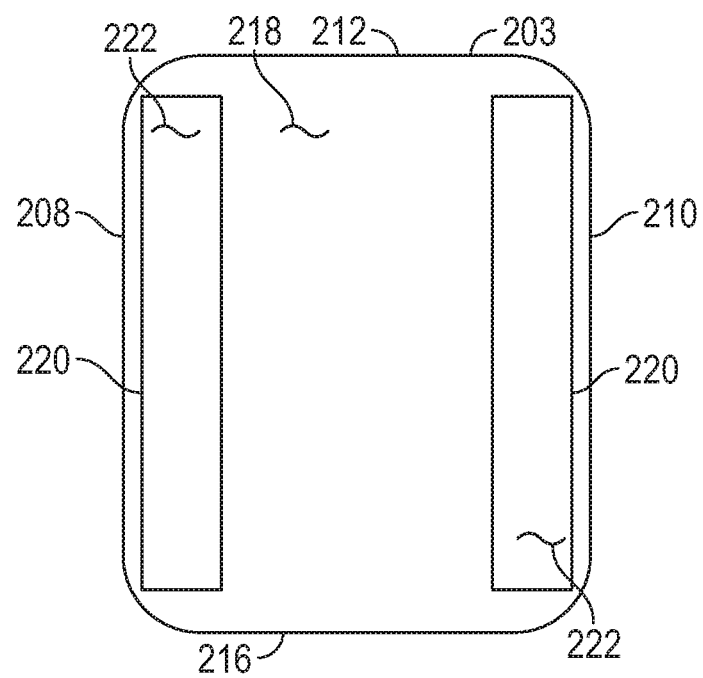

Referring to FIG. 4, there is a seismic source 200 acting upon a base plate 202 to impart a seismic source signal 204 into the earth. As best seen in FIG. 5, the base plate 202 has perimeter 203 that defines a rectangular shape with long sides, 208, 210 and short sides 212, 216. The base plate 202 also has an upper surface 217 engaging the seismic source 200 and a bottom surface 218.

In one non-limiting embodiment of the present disclosure, elongated contact members 220 project downward from the lower surface 218. The contact members 220 run parallel to and along the edges of the long sides 208, 210. The contact members 220 may have a planar bottom surface 222 that contacts the soil 224. Any elongated body may be used as a contact member 220; e.g., a board, beam, strip, etc. Moreover, the contact member 220 is not limited to any particular cross-sectional shape. The bottom surface 222 has less surface area than the recessed lower surface 218. In embodiments, the surface area of the bottom surface 222 may be less than 90%, less than 75%, less than 50%, or less than 25% of the surface area of the lower surface 218. Thus, the pressure applied by the contact members 220 is greater than the pressure that would be applied by the lower surface 218 of the base plate 202.

It is believed that the reduction in surface area in contact with the soil may also be beneficial by reducing the amount of possible shifts in contact area. By way of example, the bottom surface 218 may be have contact with 90% of the underlying soil Thus, due to soil make-up and topography, about 10% of the bottom surface 218 may not contact soil. During operation, this percentage may not change. However, the areas making up the 90% of contact may shift, which may diminish source efficiency. Thus, by reducing the amount of surface contact area, the amount of such shifting may also be reduced, which enhances source efficiency.

Figure 6A:
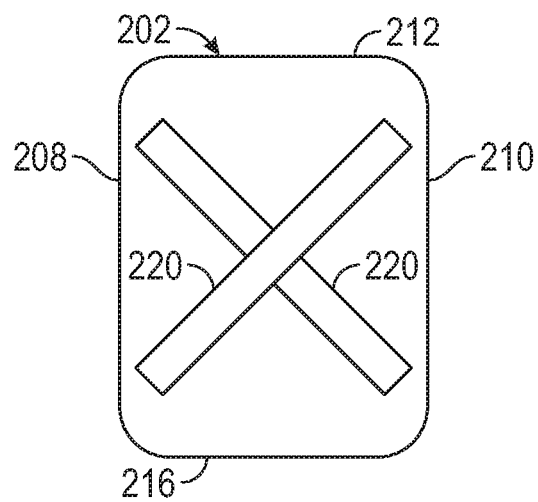
Figure 6B:
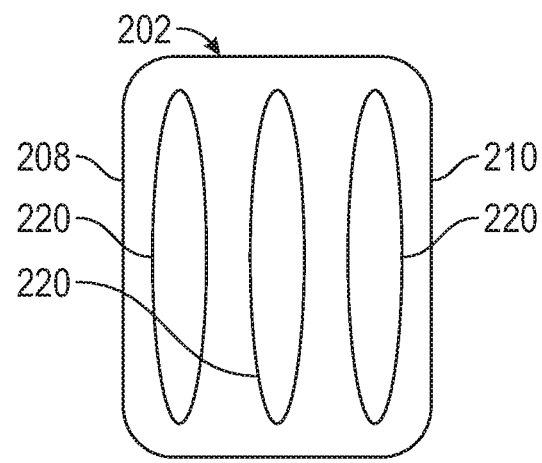
Figure 6C:
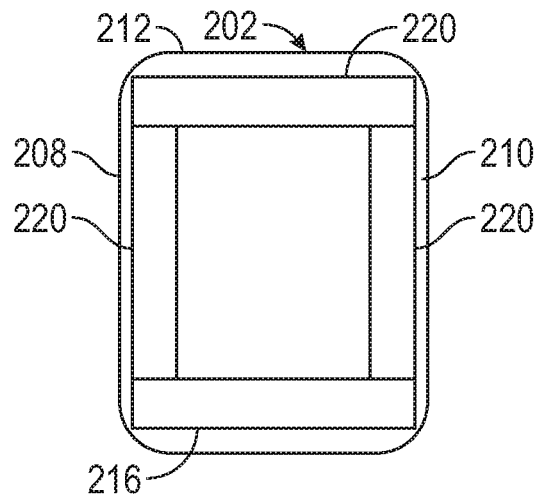
Figure 6D:
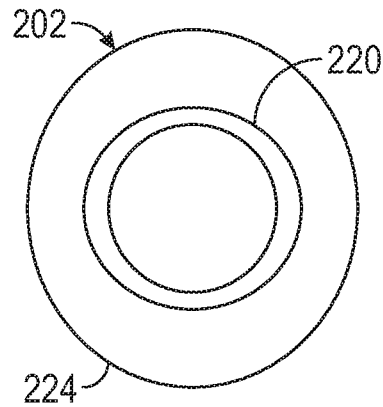

FIGS. 6A-D show additional variations of contact members 220. In FIG. 6A, the contact members 220 traverse the base plate 202 along the long sides 208, 210 and cross from one short side 212 to the other short side 216. In FIG. 6B, three non-rectangular contact members 220 run along the long sides 208, 210. In FIG. 6C, contact members 220 run along the long sides 208, 210 and the short sides 212, 216 of the base plate 202. In FIG. 6D, a non-rectangular base plate 202 is defined by a perimeter 224. The contacting member 220 is formed as a circular member and positioned interior of the perimeter 224. Thus, from the above, it should be understood that the base plates and contacting members may be of any shape and relative size. Also, the contact members may be of any number and may be positioned near the perimeter of the base plate or at an interior location.

The contact members 220 may be formed as a detachable structure that can be fitted onto the bottom of the base plate 202. Thus, the contact members 220 may be removed from the base plate 202 when not needed.

Referring to FIGS. 4 to 6A-D, during use, the seismic source 200 may be operated to generate a wavelet. For operations involving consolidated soil, the seismic source 200 has a first configuration wherein the lower surface 218 of the base plate 202 contacts the ground. For operations involving unconsolidated soil, the seismic source 200 has a second configuration wherein one or more contact members 220 are attached to the base plate 202. In the second configuration, when the base plate 106 initially begins applying force, only the bottom surface 222 of the contact member(s) 220 contact the soil. The recessed bottom surface 218 of the base plate 202 does not contact the soil during such operations. As noted above, the pressure applied by the contact members 220 is greater than the pressure that would be applied by the lower surface 218 of the base plate 202 and since less area is being contacted, there is less risk of soil shifting and causing decoupling. Seismic sources and base plate can be moved between consolidated and unconsolidated soils and the contact member(s) may be added or removed as needed.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure.

The invention claimed is:

1. An apparatus for seismic surveying, comprising:
   a seismic source;
   a base plate driven by the seismic source, the base plate having a bottom surface contacting a surface of the ground;
   a coupler connectable to the bottom surface of the base plate, the coupler projecting downward from the base plate and configured to contain soil under the base plate; and
   wherein the vibrator truck has a first configuration wherein only the bottom surface of the base plate contacts the ground and a second configuration wherein the coupler and the bottom surface of the base plate contact the ground.

2. The apparatus of claim 1, wherein the coupler includes at least one downwardly projecting wall.

3. The apparatus of claim 1, wherein the coupler includes a plurality of walls arranged in a grid-like manner.

4. The apparatus of claim 1, wherein the coupler is configured to prevents soil beneath the base plate from shifting to a location adjacent to the base plate.

5. The apparatus of claim 1, wherein the bottom surface of the base plate and the coupler cooperate to confine soil movement along at least two axis that are transverse to one another.

6. A method for seismic surveying, comprising:
   connecting a coupler to a base plate associated with a seismic source, wherein the coupler has at least one downwardly projecting wall;
   positioning a seismic source over a ground surface having unconsolidated soil;
   contacting the ground with the base plate and coupler;
   preventing soil under the base plate from shift from beneath the base plate using the at least one wall;
   removing the coupler from the base plate;
   moving the seismic source to a ground that has consolidated soil; and
   contacting the ground with only the base plate.

7. An apparatus generating seismic signals in an earth formation, comprising:
   a seismic source;
   a base plate driven by the seismic source, the base plate having an upper surface engaging the seismic source, a lower surface configured to contact a soil surface, and a perimeter; and
   at least one contact member projecting from the lower surface, the at least one contact member having a planar bottom surface with a surface area less than a surface area of the base plate lower surface.

8. The apparatus of claim 7, wherein the at least one contact member is an elongated body.

9. The apparatus of claim 7, wherein the surface area of the at least one contact member bottom surface is less than 90% of the surface area of the base plate lower surface.

10. The apparatus of claim 7, wherein the surface area of the at least one contact member bottom surface is less than 50% of the surface area of the base plate lower surface.

11. The apparatus of claim 7, wherein the seismic source has a first configuration wherein only the bottom of the base plate contacts the ground and a second configuration wherein only the at least one contact member contacts the ground.

12. A method for generating seismic signal, comprising:
   positioning a seismic source over a ground surface having unconsolidated soil;
   driving a base plate using the seismic source, the base plate having an upper surface engaging the seismic source, a lower surface configured to contact a soil surface, and a perimeter; and
   contacting a soil surface using only at least one contact member projecting from the lower surface, the at least one contact member having a bottom surface with a surface area less than a surface of the base plate lower surface;
   removing the at least one contact member from the base plate;
   moving the seismic source to a ground that has consolidated soil; and
   contacting the ground with only the base plate.

13. An apparatus for seismic surveying, comprising:
   a hydraulically actuated seismic source that includes a reaction mass;
   a base plate acted on by the reaction mass when driven by the seismic source to generate a pulse having an amplitude sustained over a predefined time period in a downward vertical direction, the base plate having a bottom surface physically contacting a surface of the ground; and
   a coupler connectable to the bottom surface of the base plate, the coupler projecting downward from the base plate and configured to contain soil under the base plate, wherein the coupler includes at least one downwardly projecting wall that is formed along a perimeter of the coupler and arranged to prevent soil underneath the base plate from shifting to a location adjacent to the base plate,
   wherein a bottom surface of the base plate physically contacts and transmits force to the earth.

* * * * *